United States Patent [19]

Nagao

[11] Patent Number: 4,924,105
[45] Date of Patent: May 8, 1990

[54] OPTICAL MEASURING DEVICE WITH ALTERNATELY-ACTIVATED DETECTION

[75] Inventor: Toshishige Nagao, Hyogo, Japan

[73] Assignee: Mitsubishi Denki Kabushiki Kaisha, Tokyo, Japan

[21] Appl. No.: 273,916

[22] Filed: Nov. 21, 1988

[30] Foreign Application Priority Data

Mar. 15, 1988 [JP] Japan .................................. 63-62139

[51] Int. Cl.$^5$ ............................................ G01N 21/86
[52] U.S. Cl. ..................................... 250/560; 356/381
[58] Field of Search ................ 250/560, 561; 356/381, 356/382

[56] References Cited

U.S. PATENT DOCUMENTS

| | | | |
|---|---|---|---|
| 4,298,286 | 11/1981 | Maxey et al. | 356/381 |
| 4,555,633 | 11/1985 | Bjorkelund | 250/560 |
| 4,806,776 | 2/1989 | Kley | 250/560 |

Primary Examiner—David C. Nelms
Attorney, Agent, or Firm—Oblon, Spivak, McClelland, Maier & Neustadt

[57] ABSTRACT

An optical measuring device for measuring a thickness of a workpiece or a height of a step thereof comprises a pair of deviation measuring means disposed in opposing relation to the workpiece, a pulse generating circuit for producing alternative pulse signals to control the deviation measuring means and signal processing means for adding outputs of the deviation measuring means each including an optical position detecting element having a light receiving plane disposed on an optical axis having a predetermined angle with respect to an optical axis of light beam irradiating the workpiece, a laser light source for emitting the light beam, a drive circuit responsive to the pulse signal to control the laser light source such that the optical position detecting element is irradiated with the light beam alternatively so that the deviation measuring means is operable only when the laser light source is emitting the light beam.

6 Claims, 4 Drawing Sheets

OPTICAL MEASURING DEVICE WITH ALTERNATELY-ACTIVATED DETECTION

BACKGROUND OF THE INVENTION

The present invention relates to a non-contact optical measuring device for measuring thickness or step height of a workpiece.

FIG. 3 shows a conventional optical measuring device using deviation measuring means disclosed in, for example, Japanese Patent Publication No. 10561/1981 applied to a measurement of thickness of a workpiece. In the same figure, on both sides of a workpiece 5, a pair of deviation measuring means 16 are disposed and outputs of the deviation measuring means 16 are supplied to a signal processing means 17.

Each deviation measuring means 16 includes a pulse generating circuit 1 for determining a driving timing of a semiconductor laser 3 and sampling times of sample-hold circuits 13 and 14 to be described later. A drive circuit 2 drives the semiconductor laser 3 on a basis of pulses generated by the pulse generating circuit 1. A lens 4 condenses lights from the semiconductor laser 3 to focus it on the workpiece 5 as a spot 6. A light receiving lens 7 focuses an image of the light spot 6 on the workpiece 6 onto a light receiving element 8 to convert a position of the image of the light spot 6 focussed thereby into an electric signal.

Reference numerals 9 and 10 are amplifiers for amplifying electric signals from the light receiving element 8, 11 is a subtractor for obtaining a difference between outputs of the amplifiers 9 and 10, 12 is an adder for adding the outputs of the amplifiers 9 and 10, 13 and 14 are sample-hold circuits for sampling and holding outputs of the subtractor 11 and the adder 12 on the basis of sample timing signals from the pulse generator 1, respectively, and 15 is a divider for obtaining a ratio of the outputs of the sample-hold circuits 13 and 14. The signal processing means 17 functions to add a pair of outputs from the deviation measuring means 16 from which a thickness of the workpiece 5 is calculated.

In operation, the semiconductor laser 3 is driven by the drive circuit 2 such that it emits a pulsed beam. Light from the semiconductor laser 3 is condensed by the lens 4 and directed to a surface of the workpiece 5 perpendicularly. Any surface which is not an ideal mirror surface scatters an incident light and therefore it is possible to detect a bright light spot at various angles with respect to the incident light. When the lens 7 is disposed on the optical axis which makes a predetermined angle with respect to the irradiating beam to form an image of the light spot on the light receiving plane of the light receiving elements 8, the output currents i1 and i2 of the light receiving element 8 become correspondent to the position of the light spot of the light receiving planes. These outputs are amplified by the amplifiers 9 and 10 and then signals corresponding to (i1−i2) and (i1+i2) are derived therefrom by the subtractor 11 and the adder 12 which are supplied to the sample-hold circuits 13 and 14, respectively. The latter circuits function to sample the input signals in synchronism with the drive pulse from the pulse generator 1 and the received light signal in the form of pulse is converted into d.c. signals. The calculation of (i1−i2)/(i1+i2) is performed by the divider 15 to obtain a signal proportional to the position of the light spot formed on the light receiving plane of the light receiving element 8, from which a deviation of the workpiece can be known.

In more detail, in FIG. 4 which shows the light receiving element 8 in FIG. 3 in detail, the light receiving element 8 includes a frame 31, an N type semiconductor 32 disposed in the frame 31, a P type semiconductor 33 formed on a surface of the N type semiconductor 32, an electrode 34 attached to the N type semiconductor 32, a first electrode 35 attached to the P type semiconductor 33, a second electrode 36 attached to the P type semiconductor 33, a power source 37, a resistor as load 38 and a resistor as load 39. 40 depicts an incident light reflected from the light spot 6 focussed by the light receiving lens 7 (cf. FIG. 3) and 41 is an intensity distribution P(x) of the incident light 40.

It is usual that a resistance of the P type semi-conductor 33 on the surface of the N type semiconductor 32 is relatively large and uniform. When the incident light 40 has an intensity distribution P(x) with respect to a distance x from a center of the light receiving element 8, currents i1 and i2 flowing through the small resistors 38, 39 can be approximated by the following equations (1) and (2).

$$i1 - i2 = K1 \int_{-l}^{l} P(x) \cdot x \, dx \quad (1)$$

$$i1 - i2 = K1 \int_{-l}^{l} P(x) \, dx \quad (2)$$

where K1, K2 are constants and l is a distance from the center of the light receiving element 8 to an end thereof.

Therefore, by calculating a ratio of (i1−i2) to (i1+i2), it is possible to obtain a position of the center of incident light on the light receiving element 8. For example, when it is assumed that the resistance value of the P type semiconductor 33 is large, that resistance values of the N type semiconductor 32 and the resistors 38 and 39 are negligible compared with the resistance value of the P type semiconductor 33, respectively, and that the light spot can be considered as a point, the following equations are established:

$$r(l-x)i1 = E \quad (3)$$

$$r(l-x)i2 = E \quad (4)$$

where r is a resistance value per unit distance of the P type semiconductor in l direction.

From the equations (3) and (4), the following equation is obtained:

$$(i1 + i2)x = l(i1 - i2) \quad (5)$$

$$x = l(i1 - i2)/(i1 + i2)$$

When the outputs of the pair of deviation measuring means 16 obtained in this manner are represented by l1 and l2, respectively, and an initially set reference value is represented by K, the thickness T is calculated by the signal processing means 17 according to the following equation.

$$K - (l1 + l2) = T \quad (6)$$

Incidentally, when the relation between l1 and l2 is as shown in FIG. 6, a step height T is calculated by the following equation $$(l1 - l2) = T \qquad (7)$$

Since the conventional optical measuring device is constituted as above, when a workpiece to be measured is semitransparent, an irradiating light from one of the deviation measuring means passes partially through the workpiece or a reflection light from the workpiece falls in a light receiving element of the other deviation measuring means. Therefore, an error may be introduced into a measured value of thickness or step height.

SUMMARY OF THE INVENTION

An object of the present invention is to provide an optical measuring device capable of measuring thickness of a workpiece or height of a step portion thereof without being influenced by another measuring means associated therewith.

In the present invention, light beams from a pair of deviation measuring means irradiate a workpiece alternatively and a deviation is obtained by using a signal received within a time for which one of the deviation measuring means emits a light beam. Therefore, it is possible to exclude an influence of irradiating light from the other deviation measuring means.

DETAILED DESCRIPTION OF THE PREFERRED EMBODIMENT

Figure 1:
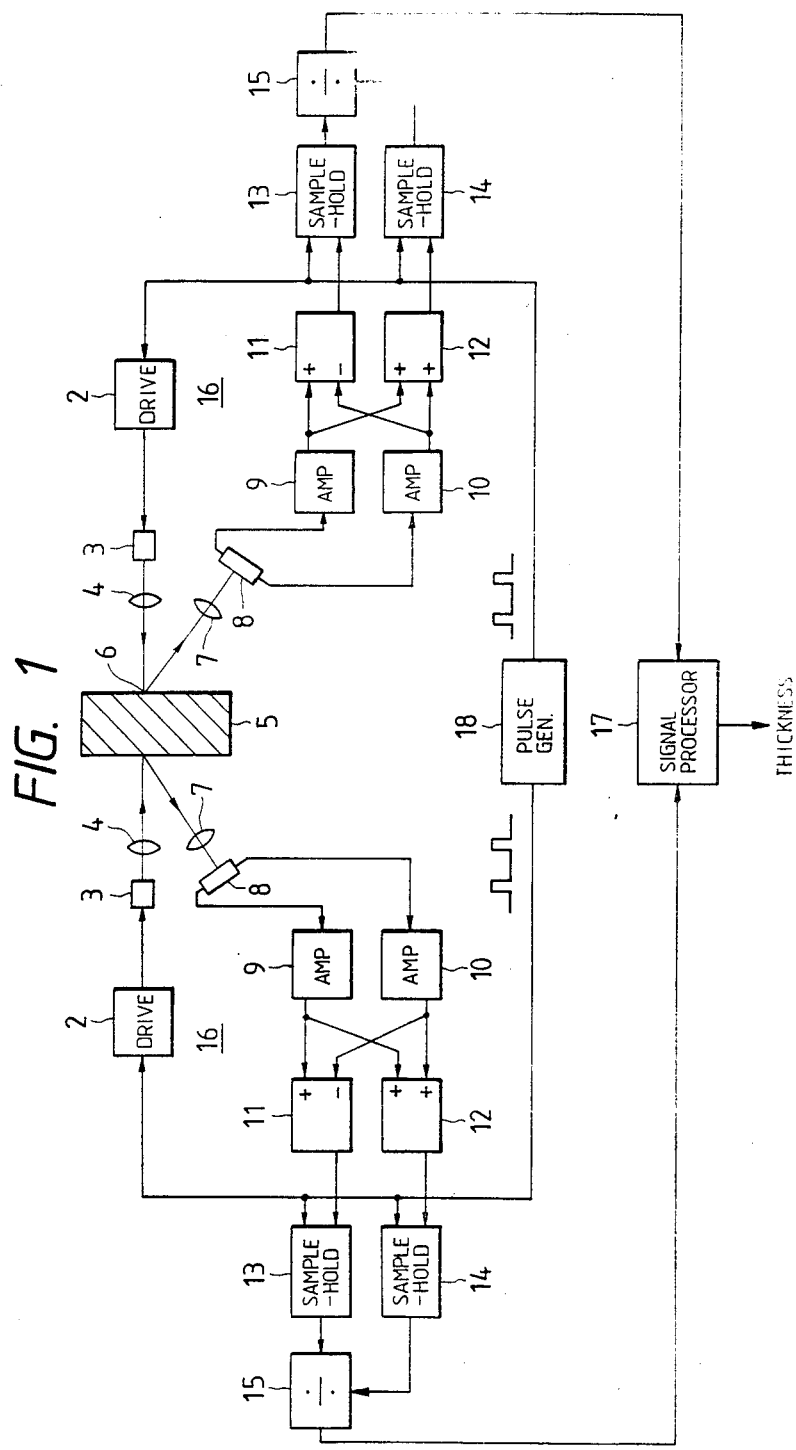
FIG. 1 shows a construction of an embodiment of the present invention.
Figure 2:
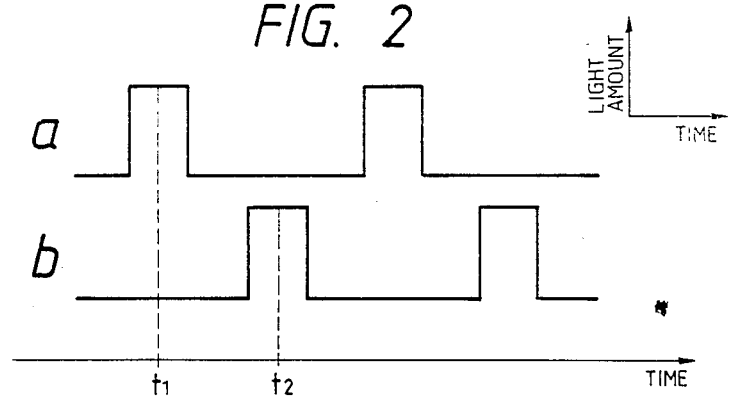
FIG. 2 shows output waveforms of a pulse generator in FIG. 1.
Figure 4:
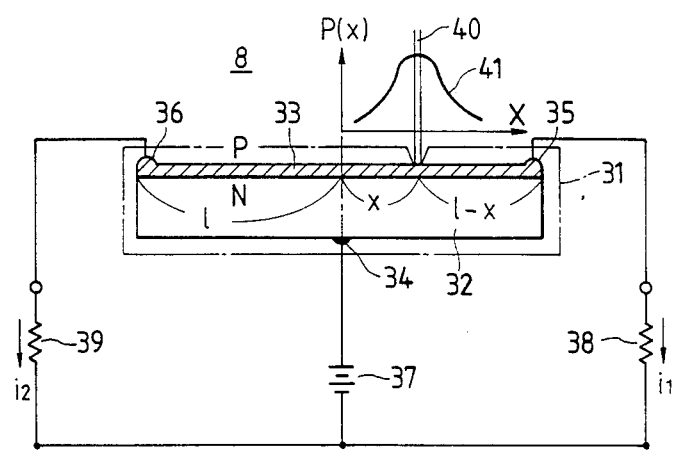
FIG. 4 shows a construction of a light receiving element shown in FIG. 3.
Figure 3:
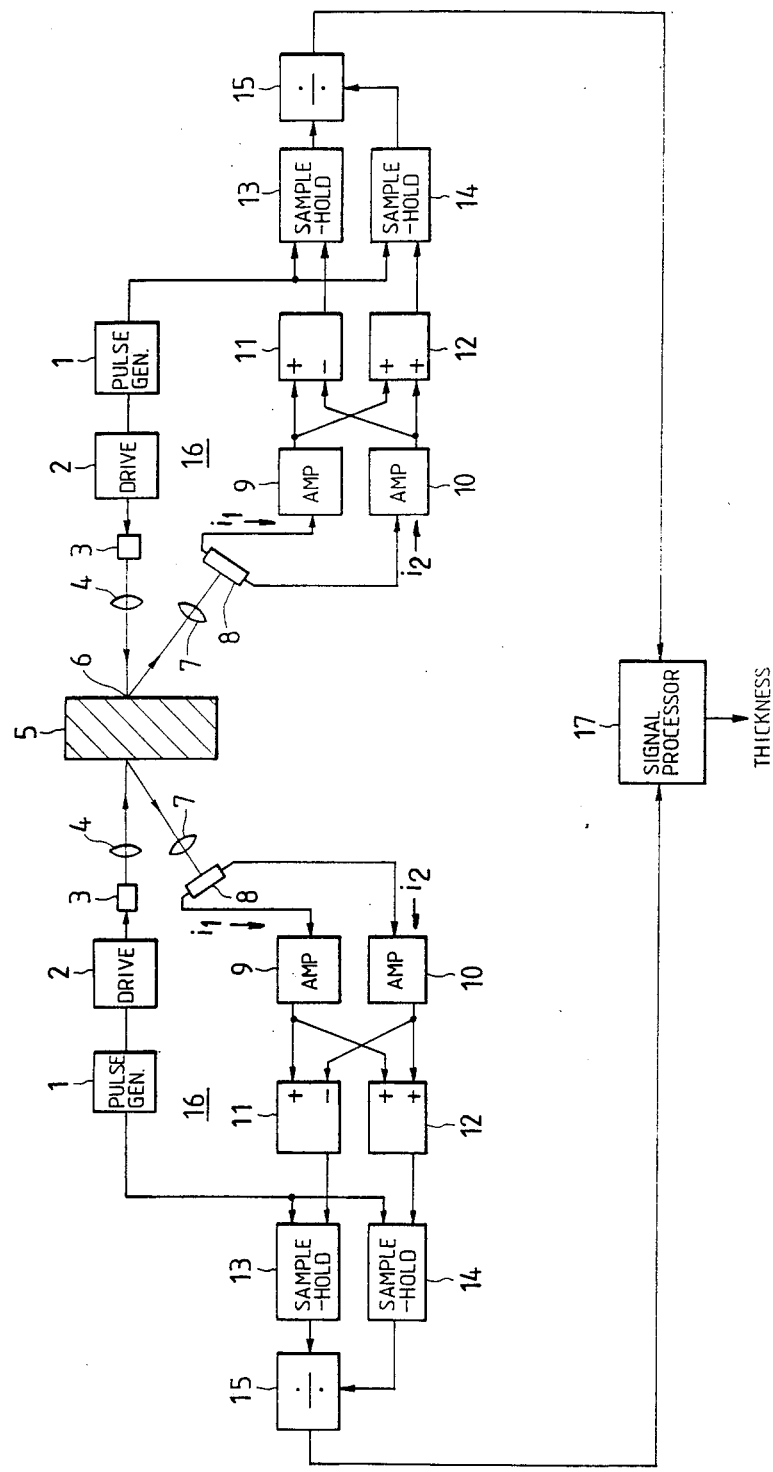
FIG. 3 shows a construction of a conventional optical measuring device.
Figure 5:
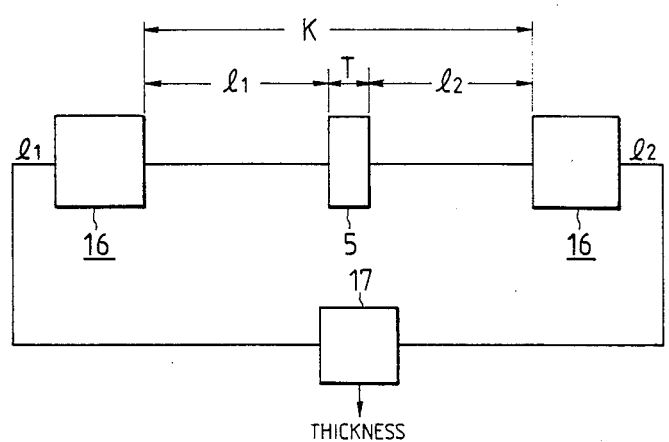
FIG. 5 illustrates a measurement of thickness of a workpiece using the construction shown in FIG. 3.
Figure 6:
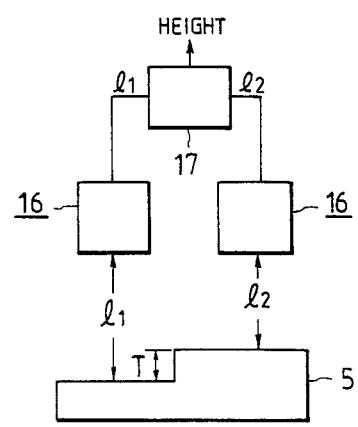
FIG. 6 illustrates a measurement of a step height of a workpiece using substantially the same construction as shown in FIG. 3.

An embodiment of the present invention will be described with reference to FIG. 1, in which components depicted by reference numerals 2 to 17 are the same as those of the conventional device shown in FIG. 3 and, so, details thereof are omitted. In FIG. 1, a pulse generator 18 is substituted for pulse generators 1 used in the conventional device shown in FIG. 3 for generating pulses having waveforms a and b (FIG. 2) to be supplied to drive circuits 2 and sample-hold circuits 13 and 14, alternatively.

An operation of this embodiment will be described with reference to the thickness measurement.

In FIG. 1, the pulse generator 18 supplies, to a pair of the drive circuits 2, pulses having ON period alternatively. The drive circuits 2 respond thereto to drive light sources 3 such that light from the light source 3 associated with one of the drive circuits 2 has the waveform a and that from the other light source 3 has the waveform b.

The sample-hold circuits 13 and 14 sample the signals according to the respective drive pulses and convert them into d.c. components. That is, the sample-hold circuits 13 and 14 of one of the deviation measuring means 16 perform the sample-hold operation at a time instance t1 and the sample-hold circuits 13 and 14 of the other deviation measuring means 16 perform the sample-hold operation at a time instance t2. The d.c. signals obtained in this manner contain only light components of irradiating light of its own system. Therefore, it is not influenced by irradiating light in the other system even if the workpiece has a transparency to light.

In a case of the step height measurement in which both of the deviation measuring means 16 are disposed in one side of the workpiece 5, light beams from the deviation measuring means 16 are made alternative and, as in the thickness measurement, one of the deviation measuring means 16 which is emitting a light beam obtains a deviation by using signals received thereby within a time for which it emits the light beam. Therefore, it is not influenced by reflection light of light beam emitted by the other deviation measuring means 16.

As mentioned above, according to the present invention, it is possible to improve the accuracy of thickness since the measuring in one deviation measuring means is not influenced by light beam emitted by the other even if light beams are directed to a transparent workpiece from opposite sides thereof.

Further, it is possible to improve the accuracy of step height measurement since the measuring in one deviation measuring means is not influenced by light beam emitted by the other even if both of the deviation measuring means are disposed in the same side of the workpiece.

What is claimed is:

1. An optical measuring device for measuring a workpiece, comprising:
   a first deviation measuring means; and
   a second deviation measuring means;
   said second deviation measuring means, comprising:
   first light emission means for directing a first light beam upon said workpiece at a time t1;
   first drive circuit means for activating the first light emission means;
   first light receiving means for generating a plurality of first measurement data which are a function of the first light beam reflected from said workpiece;
   first addition and subtraction means for adding and subtracting said plurality of first measurement data;
   first sample hold means for sampling and holding the subtracted and added plurality of first measurement data from said first addition and subtraction means at the time t1; and
   said second deviation measuring means, comprising:
   second light emission means for directing a second light beam upon said workpiece at a time t2;
   second drive circuit means for activating the second light emission means;
   second light receiving means for generating a plurality of second measurement data which are a fuction of the second light beam reflected from said workpiece;
   second addition and subtraction means for adding and subtracting said plurality of second measurement data;
   second sample hold means for sampling and holding the subtracted and added plurality of second measurement data at the time t2;
   said measuring device further comprising:
   pulse generating means for providing said first drive means and for providing said first sample hold means with a first pulse which occurs at the time t1, and for providing said second drive means and said second sample hold means with a second pulse which occurs at the time t2 and wherein the time t1 and the time t2 represent different and non-overlapping time intervals.

2. An optical measuring device according to claim 1, wherein:
when a thickness of said workpiece is measured said first deviation measuring means and said second deviation measuring means are disposed on opposite sides of said workpiece.

3. An optical measuring device according to claim 1, wherein:
when a height of a step portion of said workpiece is to be measured said first and second deviation measuring means are disposed on the same side of said workpiece.

4. A method for measuring a workpiece, comprising the steps of:
generating a first pulse at a time t1 which activates a first light emitting device;
directing a first light beam from said first light emitting device upon said workpiece at the time t1;
collecting a plurality of measurement data which are a function of the first light beam reflected from said workpiece at the time t1;
generating a second pulse at a time t2 which activates a second light emitting device;
directing a second light beam from said second light emitting device upon said workpiece at a time t2;
collecting a plurality of measurement data which are a function of the first light beam reflected from said workpiece at the time t2, and
wherein the time t1 and the time t2 represent different and non-overlapping time intervals.

5. A method according to claim 4, wherein:
when a thickness of said workpiece is measured the first and second light beams are directed on opposite sides of said workpiece.

6. A method according to claim 4, wherein:
when a height of a step portion of said workpiece is to be measured said first and second light beams are directed on the same side of said workpiece.

* * * * *